United States Patent [19]
Müller et al.

[11] Patent Number: 5,354,095
[45] Date of Patent: Oct. 11, 1994

[54] OCCUPANT RESTRAINT SYSTEM HAVING AN AIRBAG

[75] Inventors: Manfred Müller, Deizisau; Luigi Brambilla, Böblingen; Wolfgang Henseler, Tübingen; Guido Wetzel, Böblingen, all of Fed. Rep. of Germany

[73] Assignee: Mercedes-Benz AG, Fed. Rep. of Germany

[21] Appl. No.: 116,989

[22] Filed: Sep. 7, 1993

[30] Foreign Application Priority Data

Sep. 4, 1992 [DE] Fed. Rep. of Germany ....... 4229565

[51] Int. Cl.⁵ ............... B60R 21/20; B60R 21/22; B60R 21/16
[52] U.S. Cl. .................... 280/728 B; 280/732
[58] Field of Search ............ 280/731, 732, 743, 728 B

[56] References Cited

U.S. PATENT DOCUMENTS

| | | | |
|---|---|---|---|
| 4,332,398 | 6/1982 | Smith | 280/732 |
| 4,810,005 | 3/1989 | Föhl | 280/732 |
| 4,968,057 | 11/1990 | Rafferty | 280/731 |
| 5,069,480 | 12/1991 | Good | 280/743 |
| 5,131,678 | 7/1992 | Gardner et al. | 280/732 |
| 5,183,288 | 2/1993 | Inada et al. | 280/732 |

FOREIGN PATENT DOCUMENTS

| | | |
|---|---|---|
| 0432389 | 6/1991 | European Pat. Off. |
| 2045245 | 5/1971 | Fed. Rep. of Germany |
| 2425659 | 12/1975 | Fed. Rep. of Germany |
| 8619670 | 9/1987 | Fed. Rep. of Germany |
| 4105028 | 3/1992 | Fed. Rep. of Germany |

*Primary Examiner*—Kenneth R. Rice
*Attorney, Agent, or Firm*—Evenson, McKeown, Edwards & Lenahan

[57] ABSTRACT

The invention relates to an occupant restraint system having an air bag which is automatically inflated by means of a gas generator in the event of an accident and, during this process, emerges from a housing or the like whilst opening a padded flap which normally closes the housing or the like. In this case, an intended tearing point arranged at the edge of the flap remote from the pivot axis is undone, which intended tearing point is shielded by a thick pad swelling from contact by the occupant to be protected.

1 Claim, 2 Drawing Sheets

OCCUPANT RESTRAINT SYSTEM HAVING AN AIRBAG

BACKGROUND AND SUMMARY OF THE INVENTION

The invention relates to an occupant restraint system having an air bag which is automatically inflated by means of a gas generator in the event of an accident and, during this process, emerges from a housing or accommodation compartment whilst opening a padded flap which normally closes the housing or the accommodation compartment. An intended tearing point, arranged at the edge of the flap remote from the pivot axis is torn during inflation of the air bag. The intended tearing point connects the flap in the normal closed position to a stationary part or to the edge of a further padded flap remote from the pivot axis and is arranged offset towards the inside of the flap next to a pad swelling forming the edge of the flap remote from the pivot axis with a large cross-section in the direction of the thickness of the flap.

Occupant restraint systems of this type are known, for example, from U.S. Pat. No. 5,069,480, U.S. Pat. No. 5,131,678 and European Patent EP-A-0,432,389. Due to the intended tearing point which is offset towards the inside of the flap, the risk of injuries is reduced which vehicle occupants could sustain, in particular when the flaps are opened, if an unfortunate seating position has been assumed or if the occupant leans forward in the direction of travel.

According to German Patent Document DE-A-2,045,245, the flaps which normally cover the air bag are constructed as padded flaps, a core of foamed material being surrounded by a film-type material forming the surfaces of the flaps. These padded flaps have a certain resilience in order to prevent injuries to the occupant. However, sufficient consideration has not yet been given to the fact that the intended tearing points which tear open when the air bag is inflated can lead to injuries.

This applies similarly to an occupant restraint system known from German Utility Model 8,619,670. In this case, too, the occupant is virtually unavoidably hit by the intended tearing points of the opening flaps if the occupant happens to have leaned forwards in the direction of the flaps.

It is known from German Patent Document DE-A-2,425,659 to keep two flaps closed, which flaps face each other with their edges remote from the pivot axis in the closed state and normally cover the accommodation compartment of an air bag, by means of tearing threads which are attached on one side to the edges remote from the pivot axis on the inside of the flaps and on the other side to stationary parts in the accommodation compartment of the air bag. In this case, however, when the occupant moves near to the opening flaps, the flap edges remote from the pivot axis can lead to injuries because they have to be constructed as a relatively sturdy and hard structure to fix the tearing threads.

It is known from German Patent Document DE-A-4,105,028 to pad the edge of a covering flap, which is remote from the pivot axis, for an air bag system particularly thickly and to construct it without an intended tearing point. However, it is thus unavoidable that the accommodation compartment of the air bag is relatively easily accessible even when the flap is closed, i.e. there is a risk of manipulations being carried out on the air bag.

An object of the invention is to reduce the risk of injuries to the occupants even further in an occupant restraint system of the type specified above, in particular if the respective occupant may have moved very near to the flap or the flaps immediately prior to inflation of the air bag.

According to the invention, this object is achieved in that the pad swelling is elastically prestressed against the pad swelling of the other flap or the stationary part in such a way that, when the flap is opened, the pad swivelling projects beyond the intended tearing point radially relative to the pivot axis of the flap.

The invention is based on the general concept of constructing or arranging the edge of the flap remote from the pivot axis to be impact-damping and—above all—as a shield of the intended tearing point. It is thus avoided with high probability that the occupant near to the flap can come into contact with the intended tearing point during its opening movement.

A particular advantage of the invention lies in the fact that only a very small expenditure in terms of construction and design is necessary and considerably increased safety can nevertheless be achieved in the event of an accident.

Other objects, advantages and novel features of the present invention will become apparent from the following detailed description of the invention when considered in conjunction with the accompanying drawings.

DETAILED DESCRIPTION OF THE DRAWINGS

Figure 1:
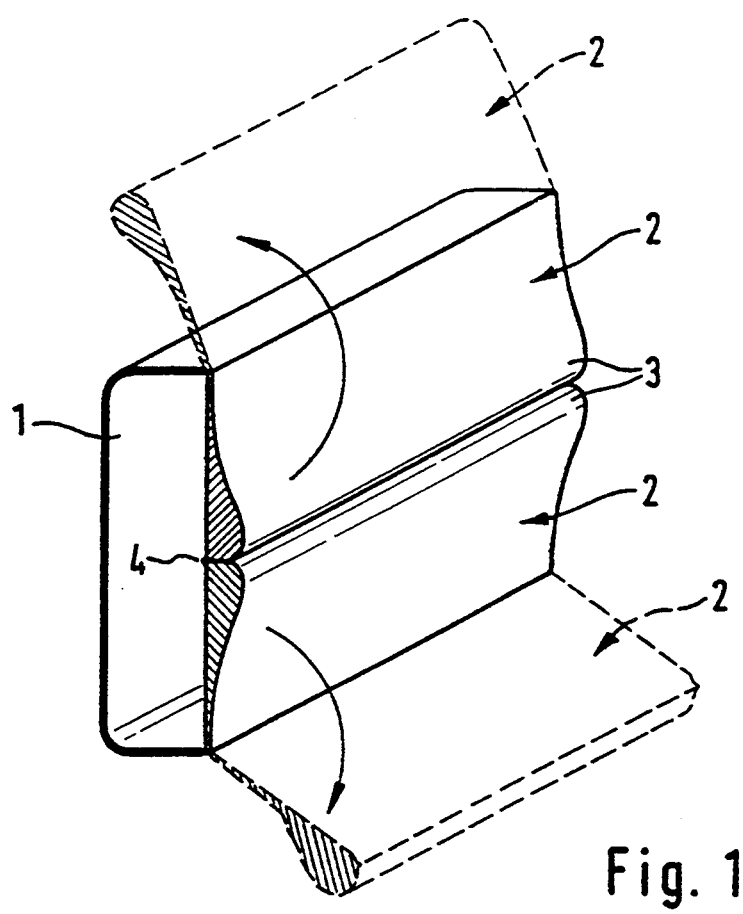
FIG. 1 is a schematic perspective view of a housing for receiving an inflatable air bag, including a flap arrangement according to the invention.

A housing 1 (illustrated only diagrammatically) accommodates a gas generator (not illustrated) and a folded air bag (likewise not illustrated) which is automatically inflated by the gas generator in the event of an accident and, during this process, emerges from the housing 1 whilst opening two flaps 2 and forms a balloonlike impact cushion.

At their edges which face each other in the closed state, the flaps 2 have thick pad swellings 3 and are normally connected to each other in a virtually immobile manner on the side of the pad swellings 3 facing the interior of the housing by an intended tearing point 4 arranged at that site.

When the flaps 2 are opened, the pad swellings 3 function, on the one hand, as an impact damping means and correspondingly protect an occupant who may be leaning towards the flaps 2 from excessively hard impacts.

On the other hand, the pad swellings 3 also function as a shield of the intended tearing point 4, i.e. it is virtually impossible for an occupant who is in the vicinity of the flaps 2 at the beginning of the opening pivoting of the flaps 2 to come into contact with the broken-open intended tearing points 4. This is because, when the flaps 2 are opened to the extent that the intended tearing points 4 could point towards the occupant, the air bag has already been inflated to a sufficiently great extent and forces the occupant away from the flaps 2.

Figure 2:
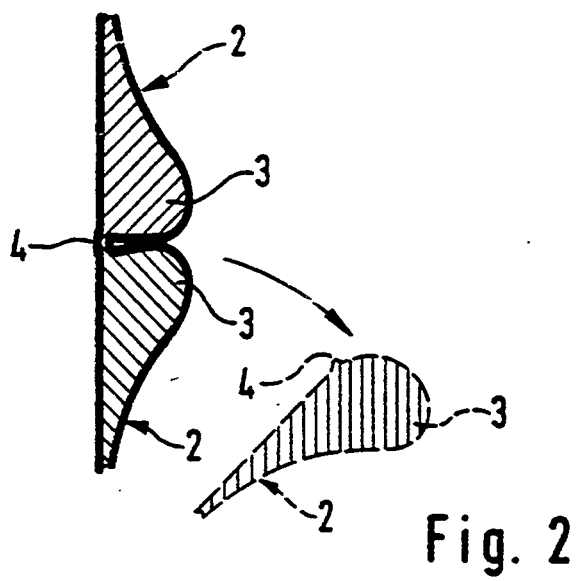
FIG. 2 shows a sectional diagram along the section line II—II in FIG. 1.

As can be seen, in particular, in FIG. 2, the pad swellings 3 are elastically prestressed, i.e. they lie on each other with relatively large pressure when the flaps are closed so that, when the flaps 2 are opened, the pad swellings 3 extend radially relative to their pivot axes and thus shield the intended tearing points 4 particularly effectively.

Figure 3:
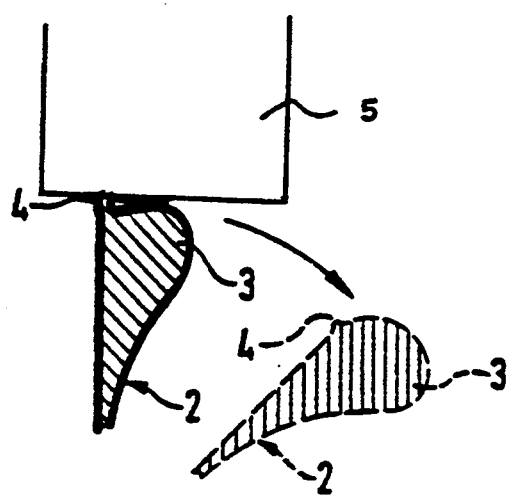
FIG. 3 shows a sectional diagram of another embodiment of the invention.

FIG. 3 shows an embodiment wherein only one padded flap 2 is used. This padded flap 2 is prestressed against a stationary part 5.

Although the invention has been described and illustrated in detail, it is to be clearly understood that the same is by way of illustration mad example, and is not to be taken by way of limitation. The spirit and scope of the present invention are to be limited only by the terms of the appended claims.

What is claimed:

1. Occupant restraint system having an air bag which is automatically inflated by means of a gas generator in the event of an accident and, during this process, emerges from a housing or accommodation compartment whilst opening a padded flap which normally closes the housing or the accommodation compartment, an intended tearing point, arranged at the edge of the flap remote from the pivot axis, being undone, which intended tearing point connects the flap in the normal closed position to one of a stationary part and to an edge of a further padded flap remote from the pivot axis and is arranged offset towards the inside of the flap next to a pad swelling forming the edge of the flap remote from the pivot axis with a large cross-section in the direction of the thickness of the flap, said pad swelling being elastically prestressed against one of the pad swelling of the other flap and the stationary part in such a way that, when the flap is opened, the pad swelling projects beyond the intended tearing point radially relative to the pivot axis of the flap.

* * * * *